United States Patent [19]
Nara

[11] Patent Number: 5,978,414
[45] Date of Patent: Nov. 2, 1999

[54] TRANSMISSION RATE JUDGING UNIT

[75] Inventor: Yoshikazu Nara, Eatontown, N.J.

[73] Assignee: Matsushita Electric Industrial Co., Ltd., Osaka, Japan

[21] Appl. No.: 08/675,010

[22] Filed: Jul. 3, 1996

[51] Int. Cl.[6] .............................. H04B 17/00; H04B 1/69
[52] U.S. Cl. ........................................... 375/225; 375/200
[58] Field of Search .................................... 375/225, 377, 375/341, 200; 371/5.1; 370/252

[56] References Cited

U.S. PATENT DOCUMENTS

| | | | |
|---|---|---|---|
| 5,566,206 | 10/1996 | Butler et al. | 375/225 |
| 5,689,511 | 11/1997 | Shimazaki et al. | 375/225 |
| 5,729,557 | 3/1998 | Gardner et al. | 371/5.5 |

*Primary Examiner*—Temesghen Ghebretinsae
*Attorney, Agent, or Firm*—Amster, Rothstein & Ebenstein

[57] ABSTRACT

A method and system is disclosed for determining an actual transmission rate of an encoded communication which has been transmitted at one of a plurality of transmission rates. An encoded communication is decoded at the plurality of transmission rates to generate decoded signals and decoding parameters which indicate the reliability of the decoded signals. One or more candidate transmission rates are identified based upon said decoding reliability parameters. If there is only one candidate transmission rate, the actual transmission rate is determined to be that candidate transmission rate. If there is more than one candidate transmission rate, the decoded signals are reencoded at the candidate transmission rates at which they were decoded. The bits of the communication are then compared with the bits of the reencoded signals for each candidate transmission rate to determine the actual transmission rate. A method and system is further disclosed for determining threshold values for comparison with the decoding reliability parameters in identifying the candidate transmission rates. A method and system is further disclosed which determines those threshold values on the basis of detected reception conditions, including the relative strength of multipath component signals and the total received power in the communication.

22 Claims, 10 Drawing Sheets

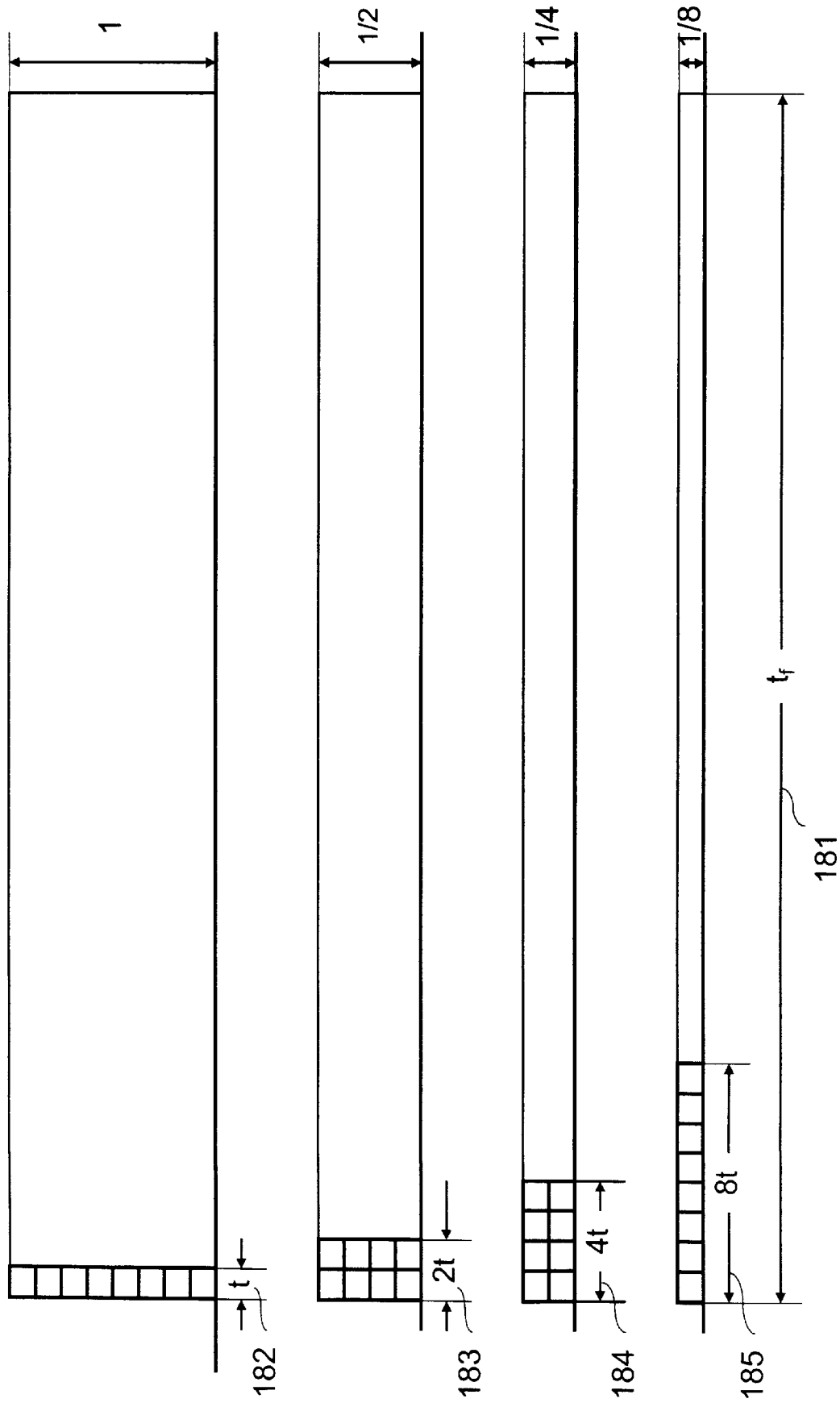

(a)

(b)

TRANSMISSION RATE JUDGING UNIT

The present invention relates to a digital communications receiver and more specifically to a system and method in a digital communications receiver for determining a transmission rate of a received frame of data which has been transmitted at a selected one of a plurality of transmission rates after the error-correction encoding thereof.

BACKGROUND OF THE INVENTION

Few examples of variable rate transmission systems exist, particularly as to variable rate transmission systems in which no signals are transmitted to indicate the transmission rate to be used by a receiver for detecting the transmitted data. The present invention is concerned with providing a system and method for determining, from information obtained as a result of the decoding process, the transmission rate at which a received frame of data has been transmitted.

Variable rate transmission will now be described, with reference to FIG. 1. In the description which follows, the transmission rate of a given frame of data will be assumed to take values which vary among 1.2 kilobits per second (kbps), 2.4 kbps, 4.8 kbps, and 9.6 kbps. A transmitter selects one of the available transmission rates of 1.2 kbps, 2.4 kbps, 4.8 kbps, and 9.6 kbps in accordance with the quantity of data to be transmitted, and the characteristics of the transmission channel. The transmitter then transmits the data at the selected transmission rate over the channel.

FIG. 1 illustrates an example of a method for constructing a single frame transmitted in accordance with a variable rate transmission system. The illustration of the construction of a frame of data in FIG. 1 is intended to be exemplary, and not as indicating any particular constraints as to the manner in which a received frame of data is to be presented to the transmission rate judging system.

As illustrated, the frames as transmitted in a variable rate transmission system have a fixed time duration or "transmission frame width $t_f$ 181, regardless of the amount of data transmitted therein in accordance with a selected transmission rate. Use of such fixed width frames permits a receiver to handle communications on a frame by frame basis according to a uniform duration in time.

As illustrated in FIG. 1, in formatting the data for transmission according to different transmission rates, the duration or 'width' of each transmitted bit is uniformly and proportionately varied. For example, if the width 182 of a bit of a frame formatted for transmission at the 9.6 kbps rate is one unit of time t, 182 two units of time 2t, 183, are needed per bit for transmission at the 4.8 kbps rate, four units of time 4t, 184, are needed for transmission at the 2.4 kbps rate, and eight units of time8t, 185, for transmission at the 1.2 kbps rate.

This results in a corresponding relationship for the instantaneous signal power of bits transmitted according to the different transmission rates. That is, since bits transmitted at the rate of 1.2 kbps are eight times longer in duration than bits transmitted at the 9.6 kbps rate, the bits transmitted at the 1.2 kbps rate can be transmitted at a correspondingly reduced power level, which can be, for example, one eighth of the power level at which bits are transmitted at the 9.6 kbps rate. The power level of bits transmitted at the 2.4 kbps and 4.8 kbps rates are also reduced correspondingly in relation to the power level used to transmit at 9.6 kbps. Reducing the transmitted power level for transmission at lower transmission rates, in this manner, reduces the overall transmitter power usage over time, and conserves energy (viz. battery power) in the transmitter, reduces interference with other transmitted communications, and increases the number of channels in the system which are available to be used at one time.

When a receiver has not been signalled with indication of the transmission rate of an incoming communication, the receiver must determine the transmission rate from the transmitted data itself. As illustrated in FIG. 1, when data is transmitted at rates lower than the maximum 9.6 kbps rate, data may appear to the receiver to have been transmitted repetitively. Thus, data which is transmitted at the 4.8 kbps rate appears to have been transmitted twice over the total transmission time in which each of the time intervals correspond to the time needed to transmit one bit at the 9.6 kbps rate. Thus, the method for determining the actual transmission rate of a transmission may be considered to be a method for determining the number of times that data bits have been repetitively transmitted.

As described above, the power levels at which data are transmitted vary according to different transmission rates. However, it is well known in digital communications that the bit error rate for a received transmission increases when the transmitted signal energy per bit of the transmission decreases. Thus, in order to reduce the probability of making an error in the determination of a transmitted data rate, a system is needed for determining the transmission rate of a received communication in a manner which accounts for increases in the bit error rate of the transmission due to the decreased signal energy which is present per transmitted bit for transmissions received at higher transmission rates.

SUMMARY OF THE INVENTION

Accordingly, it is an object of the present invention to provide a system and method for accurately determining the actual transmission rate of a received communication irrespective of the variation in the relative magnitudes of the possible transmission rates and irrespective of the magnitude of the characteristic bit error rate for the received communication.

A further object of the present invention to provide a system and method for accurately determining the transmission rate of a received communication which is based, at least partly, on the decoding result of bits which have been error correction encoded for transmission.

Still another object of the present invention to provide a system and method for accurately determining the transmission rate of a received communication through the use of parameters which result from the decoding process which provide indication as to the reliability of the results of decoding an error correction encoded signal.

Still another object of the present invention to provide a system and method for accurately determining the transmission rate of a received communication which performs an initial determination of one or more candidate transmission rates in accordance with a set of threshold values, and performs further operations to determine the actual transmission rate from among several candidate transmission rates so determined.

Still another object of the present invention to provide a system and method for accurately determining the transmission rate of a received communication based on comparing the encoded received communication and the result of reencoding the decoded received communication for each of a plurality of candidate transmission rates.

Still another object of the present invention is to provide an improved CDMA receiver system which incorporates a system and/or method for accurately determining the transmission rate of a received communication based at least partly on an initial determination of one or more candidate transmission rates.

Still another object of the present invention is to provide a CDMA receiver system which provides improved accuracy in the determination of a transmission rate by permitting adjustment of the threshold values used to determine the accuracy of decoding at a particular transmission rate based on measured reception conditions, including the relative strength of multipath components of a transmission.

BRIEF DESCRIPTION OF THE DRAWINGS

FIG. 1 shows a construction of a frame of data of a Variable rate transmission.

FIG. 3-1 (a) shows a trellis diagram which illustrates the decoding of the convolutionally encoded frame of 20 bits.

FIG. 3-1 (b) to FIG. 3-4 (l) show the Viterbi decoding process of the convolutionally encoded frame of 20 bits.

DETAILED DESCRIPTION OF THE PREFERRED EMBODIMENTS

A transmission rate judging system constructed in accordance with a first embodiment of the invention will now be described, with reference to FIG. 4. The transmission rate judging system of the present invention is used in a receiver to determine the transmission rate of a received frame of data of a digitally encoded communication, wherein the transmission rate may be any one of a plurality of transmission rates selected by a transmitter on a frame by frame basis, in accordance with the quantity of data to be transmitted. As received, each frame of data has been encoded with an error correction code which requires decoding in the receiver.

In the background description of the encoding and decoding processes which follows, a convolutional code will be described as a specific example of an error correction code, and the Viterbi method of decoding will be described as a specific example of an appropriate decoding process. However, the skilled person in the art will recognize that the present invention is not limited in application to systems which employ the particular encoding and decoding techniques which are described here.

Figure 2:
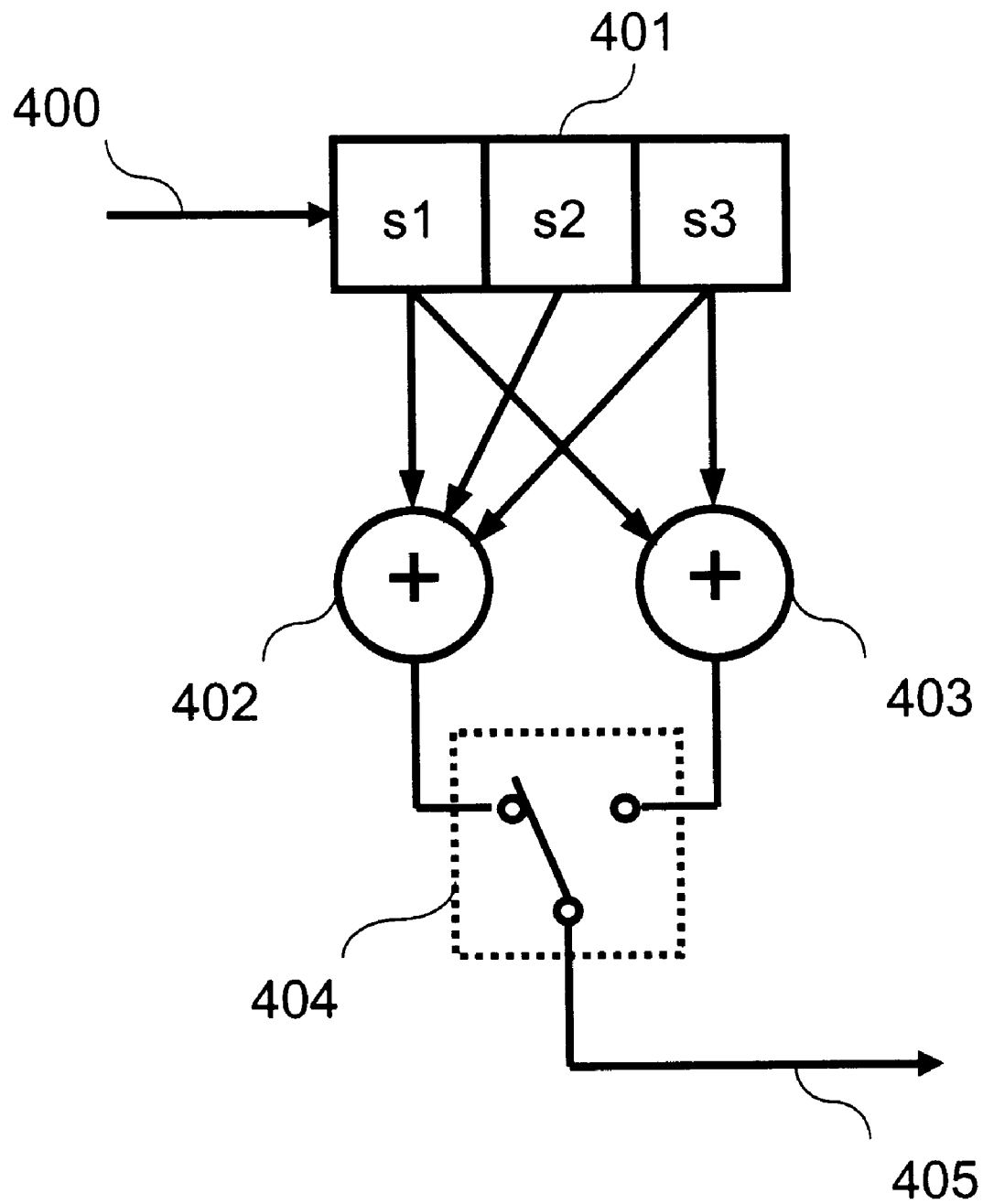
FIG. 2 is an example of a construction of a convolutional encoder.

The encoding process, as performed using a convolutional code will first be described. FIG. 2 illustrates the construction of a conventional convolutional encoder. In FIG. 2, reference numeral 401 is a three-stage shift register which accepts the sequential input 400 of a binary value of "1" or "0." At the beginning of each clock cycle, the sequential input is clocked in to the first stage s1 of the shift register, and the content of each stage during the previous cycle is shifted to the right. After the performance of the operations as indicated below, the contents of each stage of the shift register is shifted and clocked in to the next succeeding stage.

Reference numeral 402 is a modulo-2 adder which modulo-2 adds the contents of the first stage s1 of the shift register, the second stage s2 and the third stage s3 of the shift register 401. Reference numeral 403 is a modulo-2 adder which modulo-2 adds the contents of the first stage s1 and the third stage s3 of the shift register 401. Here, modulo-2 addition refers to an addition algorithm which yields a digital output value of "1" when the number of "1"s in the input is an odd number, and which yields a digital output value "0" in all other cases. Sampling switch 404 is used to provide a two-bit sequential output which includes the output of modulo-2 adder 402 and of modulo-2 adder 403 for every bit which appears in succession at the input to the shift register 401. The output 405 of sampling switch 404 forms the encoded output of the convolutional encoder.

The operations of the convolutional encoder shown in FIG. 2 will now be described. Here, the case will be described in which a stream of digital information, 10 bits in length, is input to the convolutional encoder per frame. Prior to commencement of the encoding, each stage of the shift register 401 is reset to the binary value "0". That is, s1="0", s2="0", and s3="0", where s1, s2, and s3 are the contents of the respective stages of the shift register 401. As an example, a seven bit stream of digital information bits will be assumed to have the values: "1 0 0 1 1 1 0." In addition, a stream of three bits having the binary value "0" will be placed at the end of the seven information bit stream for use in resetting the three stages of the shift register 401 after the seven information bits of the frame have been encoded. Therefore, the total stream of bits which is input to the shift register 401 in succession is a frame of ten bits having the binary values "1 0 0 1 1 1 0 0 0 0".

After the first bit of the ten bit frame, which has the binary value of "1," is input to the shift register 401, the contents of the shift register 401 becomes s1="1", s2="0", and s3=0." As a result, the output of modulo-2 adder 402 becomes "1," and the output of the modulo-2 adder 403 also becomes "1". In consequence, the two-bit output 405 of the sampling switch 404, becomes the convolutional code output "1 1". Following this, when the second bit, "0", is input to the shift register 401, the contents of the shift register 401 becomes s1="0", s2="1", and s3="0." The resultant output of the modulo-2 adder 402 becomes "1", and the output of the modulo-2 adder 403 becomes "0". As a result, the convolutionally encoded output 405 of sampling switch 404 becomes "1 0".

After the third bit of binary value "0" is input to the shift register 401, the contents of the shift register 401 becomes s1="0", s2="0", and s3="1". The resultant output of the modulo-2 adder 402 becomes "1", and the output of the modulo-2 adder 403 becomes "1". As a result, the convolutional code output 405 of sampling switch 404 becomes "1 1".

As encoded, the ten bit information stream becomes a 20 bit encoded stream having ten redundancy bits. Thus, the convolutional code output 405 of the convolutional encoder (FIG. 2) appears as a 20 bit encoded output stream having the binary values "1 1 1 0 1 1 1 1 0 1 1 0 0 1 1 1 0 0 0 0".

Figures 1, 3:
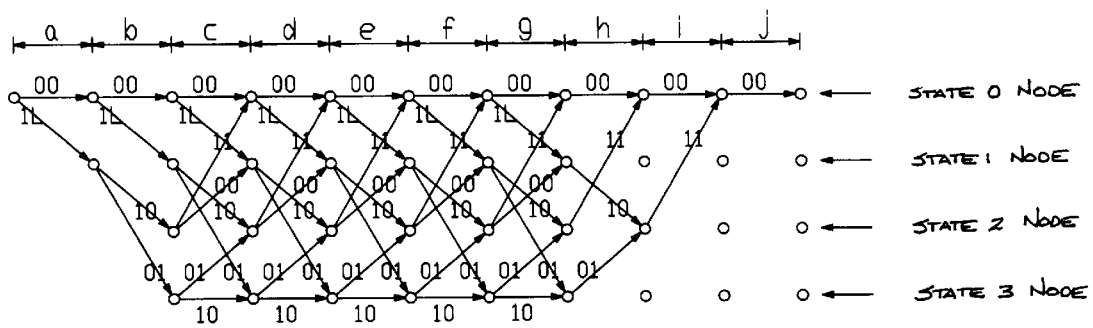
Figures 1, 3:
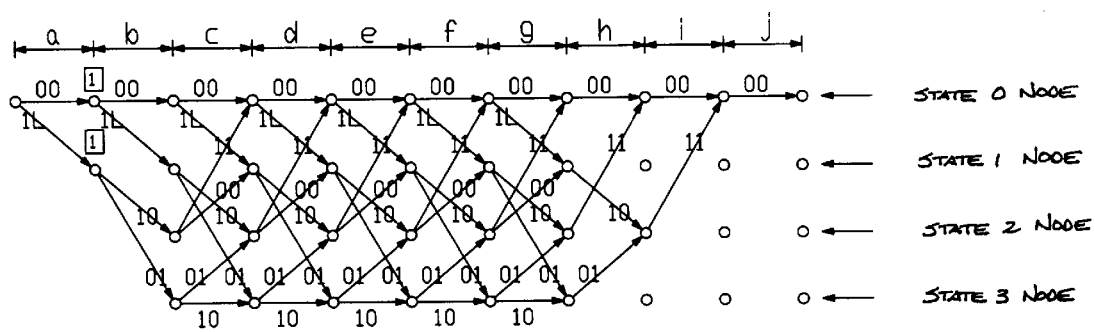
Figures 1, 3:
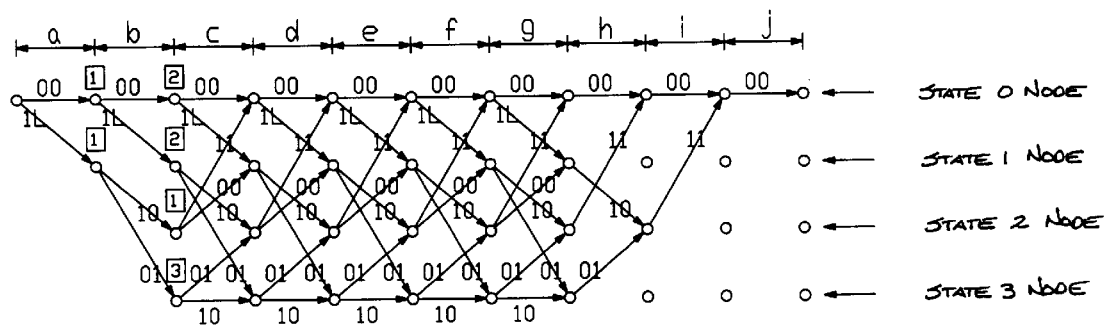
Figures 2, 3:
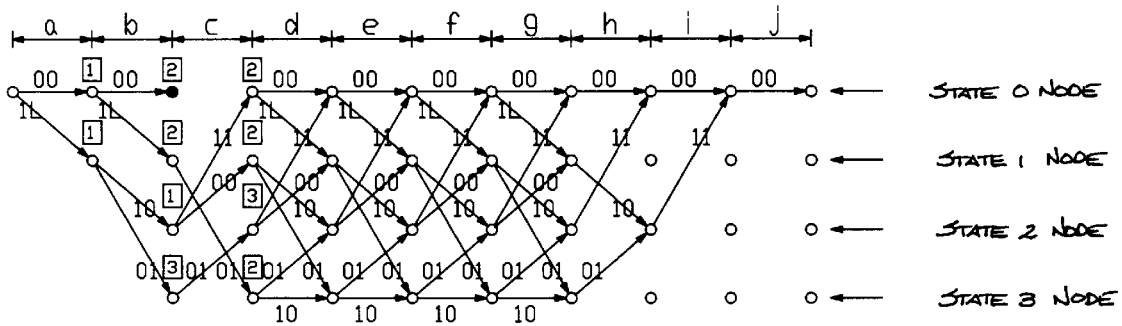
Figures 2, 3:
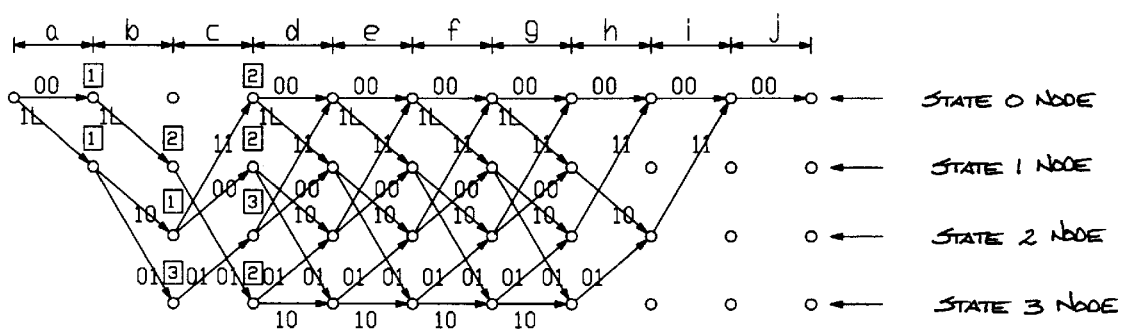
Figures 2, 3:
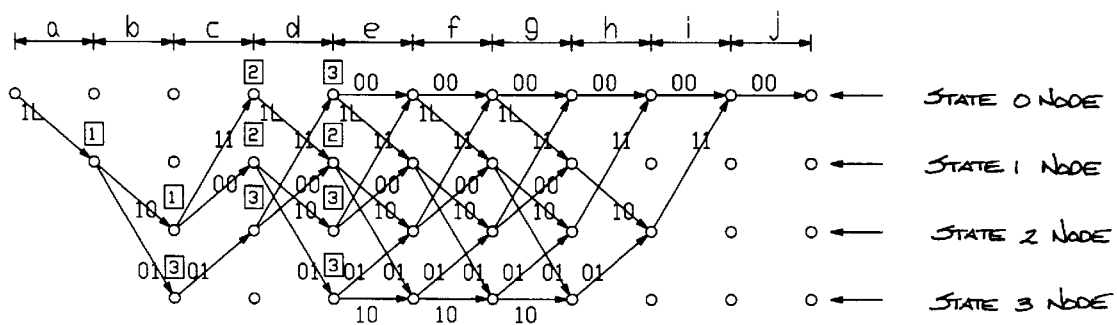
Figure 3:
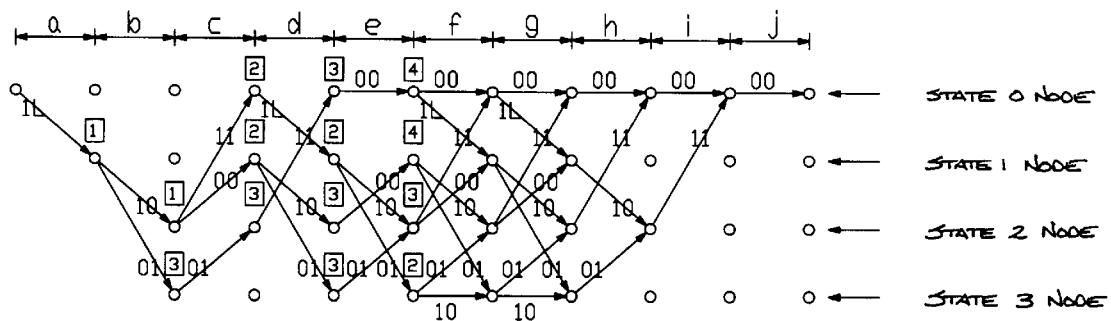
Figure 3:
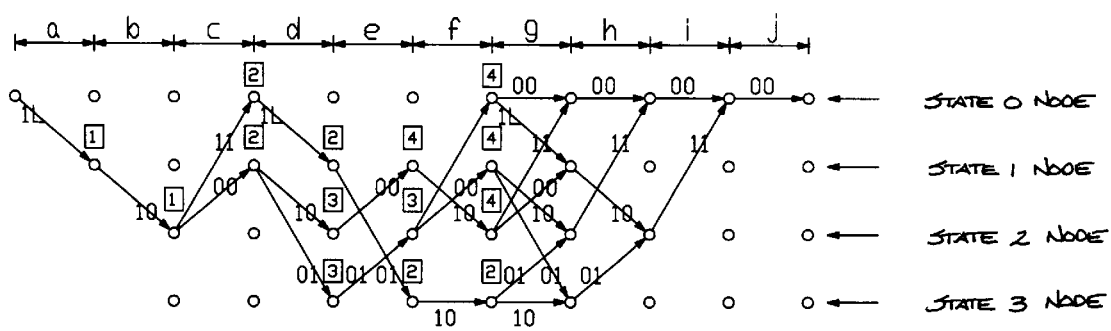
Figure 3:
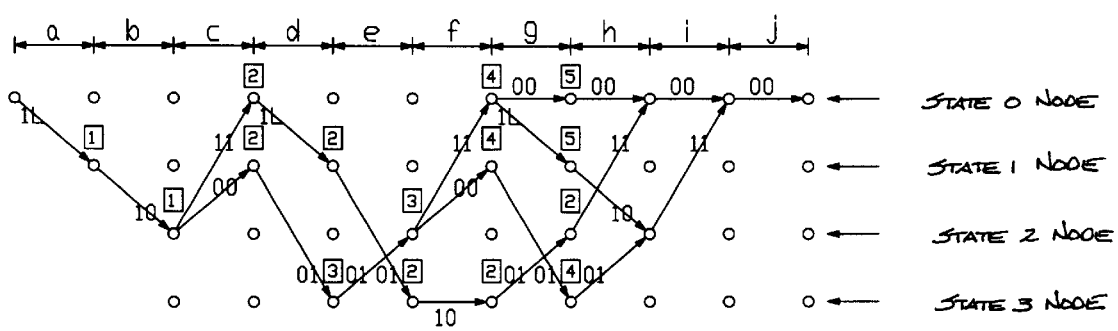

The principles of Viterbi decoding will now be described, with reference to FIGS. 3-1 to 3-4. FIG. 3-1(a) shows a trellis diagram which illustrates the decoding of the convolutionally encoded frame of 20 bits having the values: "1 1 1 0 1 1 1 1 0 1 1 0 0 1 1 1 0 0 0 0."

In order to decode a convolutionally encoded frame of bits according to the Viterbi process, a decoder in a receiver must be provided in advance with a pattern for decoding, such as is illustrated in the trellis diagram shown in FIG. 3-1(a). In the trellis diagrams shown in FIG. 3-1(a) through FIG. 3-4(l), the symbol "○" indicates a node, and the solid line arrow and the dotted line arrow indicate branches of a decoding path. The intervals a to j as shown in the abscissa, and the states 0 through 3 as shown in ordinate, indicate path segments for movement along branches of the trellis from node to node.

In order to illustrate the error correction capability of the convolutional code, the principles of Viterbi decoding will be described with specific reference to the decoding of the above convolutionally encoded 20 bit stream after an error in transmission causes two bits of the 20 bit stream to indicate the wrong binary values. The errors appear in the second and fifth bits of the 20 bit stream, as follows:

Encoded Frame As Transmitted:
"1 1 1 0 1 1 1 1 0 1 1 0 0 1 1 1 0 0 0 0"
Encoded Frame As Received:
"1 0 1 0 0 1 1 1 0 1 1 0 0 1 1 1 0 0 0 0"

Decoding according to the Viterbi process begins by dividing the encoded bits of the received frame into 2 bit frame segments as indicated:

Encoded Frame As Received:

---
"1 0", "1 0", "0 1", "1 1", "0 1", "1 0", "0 1", "1 1", "0 0", "0 0".

---

In the intervals a through j shown in FIG. 3-1(a), each successive two bit segment of the received frame is compared to alternative two bit sequences which correspond to respective branches of the trellis diagram. For example, at the commencement of the decoding, the first two bit segment "1 0" of the 20 bit frame is compared to the solid line arrow branch which corresponds to the sequence "0 0". The first two bit segment "1 0" of the 20 bit frame is also compared to the dotted line arrow branch which corresponds to the sequence "1 1", these branches being the only branches which span the interval a. As is easily seen, the first two bit segment of the frame, which has the bit values "1 0", matches neither of the branches. However, all that is required during this step of the decoding process is to calculate the number of bits which are different between the received two bit segment and the bit sequences which correspond to the branches of the trellis diagram. The results of the comparison obtained for each received two bit segment is called the Hamming distance. By way of example, the Hamming distance between the bit sequences "0 1" and "1 1" is one, while the Hamming distance between the bit sequences "1 1" and "1 1" is zero. The skilled person in the art will recognize that other ways exist for calculating the distance between different sequences of bits by determining, for example, the Euclidian distance.

After the Hamming distances have been calculated for several segments of the frame along the branches of the decoding pattern through several intervals, a decoding path along the branches of the pattern which has the smallest accumulated Hamming distance, will be selected among the several possible paths as a surviving path. For example, at intervals occurring after interval c, as shown in FIG. 3-1(a), of the two branches which are input to each node, a branch with a smaller accumulated value is selected as a surviving one. This selection process is repeated along the entire length of the decoding pattern so as to yield a surviving path through the pattern.

The decoding result is then determined by the bit values which correspond to the successive branches of the pattern which are found in the surviving path, and which therefore correspond to path of the smallest accumulated Hamming distance between the frame of encoded bits. For example, in FIG. 3-1(a), each dotted line arrow branch corresponds to a decoding result of "1" for a two bit frame segment, while each solid line arrow branch corresponds to a decoding result of "0" for a two bit frame segment.

The decoding process starts from the node at the left edge of FIG. 3-1(a). The Hamming distance between the first received frame segment "1 0" and the bit sequences for each branch of interval a of the trellis diagram are obtained. In interval a, the Hamming distance between the received frame segment "1 0" and the branch "0 0" is one, and the Hamming distance between the received frame segment "1 0" and the branch of the diagram "1 1" is also one. Therefore at the end of interval a, the accumulated value of the Hamming distances at the state 0 node is one, and the accumulated value of the Hamming distances at the state 1 node is also one. The results are expressed as the accumulated values "1" and "1" which are shown in the boxes located at the state 0 node and at the state 1 node in FIG. 3-1(b). These accumulated Hamming distances values can be referred to as path metrics for the potential decoding paths along the trellis diagram of the decoder.

Next, the Hamming distances for the next frame segment "1 0" of the 20 bit frame are obtained for each of the branches of interval b, and the path metrics for each path are updated. In interval b, the Hamming distance between the received frame segment "1 0" and the branch "0 0" is one. Similarly, the Hamming distance between the received frame segment "1 0" and the branch "1 1" is one, while the Hamming distance between the received frame segment "1 0" and the branch "1 0" is zero, and the Hamming distance between the received frame segment "1 0" and the branch "0 1" is two. Therefore, at the conclusion of the interval c, as shown in FIG. 3-1(c), the path metric which results for the state 0 node becomes '2' by adding the Hamming distance 1 for the interval b to the path metric '1' of the previous node. In a similar manner, the path metric for the state 1 node becomes '2', the path metric for the state 2 node becomes '1', and the path metric for the state 3 node becomes '3'.

Up to this point, over the intervals a and b there is only one branch which connects to nodes at the conclusion of each interval. However, from the beginning of interval c and on, there are always two branches which connect to the nodes at the conclusion of each interval in all the cases. Therefore, after interval c, the branch going into each node which has the smaller path metric of the two branches is selected as a surviving path. Thus, a process of 'choosing between the two branches' is performed prior to entering each successive node, and based on the results, one of the branches is discarded. However, when the path metrics for the two branches are identical, either of the branches may be selected at random as the surviving path.

Continuing with the example, as illustrated in FIG. 3-1(c), for the next received frame segment "0 1", the Hamming distances are again calculated for each of the branches and for each of the nodes of the states 0 through 3. As shown in FIG. 3-1(c) the Hamming distance between the frame segment "0 1" and the branch bit sequence "0 0" is one, while the Hamming distance is one in comparison with the branch bit sequence "1 1", two in comparison with the branch bit sequence "1 0", and zero in comparison with the branch bit sequence "0 1". Therefore, the decoding process results in a decoding path which connects the branches along the paths having the path metric '3' and the path metric '2' to the state 0 node. Among these, the branch along the path having a path metric of '2' is selected as a surviving path. Similarly, the decoding process connects the branches along the paths having the path metric '3' and the path metric '2' to the state 1 node and the branch on the path having the path metric '2' is selected as a surviving path.

Continuing this process for the state 2 node results in the branches along the paths having the path metric '4' and the path metric '3' being connected to the state 2 node, and the branch of the path metric '3' being selected as a surviving path. For the state 3 node, the branches on the paths having the path metric '2' and the path metric '3' are connected to the state 3 node and the branch of the path metric '2' of them is selected as a surviving path. The results of the selection process are shown in FIG. 3-2(d).

Here, it should be noted that the state 0 node shown in FIG. 3-2(d) at the conclusion of interval b is marked in solid black. As shown, there is no branch originating from that node to the next node. This indicates that there is no path which results in decoding which passes through this node. Therefore, all branches which connect into the state 0 node which is marked are eliminated from consideration. These results are reflected in FIG. 3-2(e).

The result of continuing the decoding process according to the foregoing description is that, finally, only one path which corresponds to the sequence of encoded bits in the frame will remain. The states which are entered in succession as a result of the decoding for the remaining two-bit segments of the received 20 bit frame are shown in FIG. 3-2(f) through FIG. 3-4(l). It should be noted here that the last three of the two-bit segments of the encoded stream are known a priori to have the values "0 0", since they correspond to the last three bits of the pre-encoding signal which are used to reset the stages of the shift register 401 of the convolutional encoder. Since the decoder is constructed to operate in accordance with these a priori encoding principles, the decoder selects a decoding path which results in the last three two-bit segments being decoded with the binary value "0". Therefore, in the interval h, the interval i, and the interval j of the trellis diagram, only the solid line arrows which indicate a decoding of the value "0" are connected to the next nodes.

Figures 3, 4:
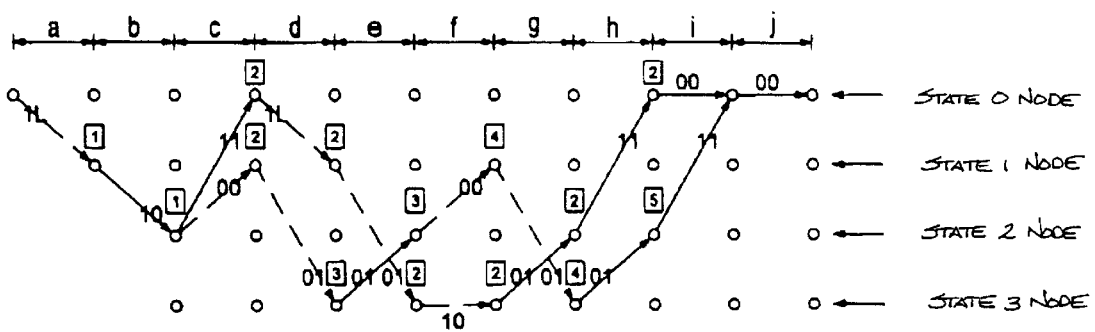
Figures 3, 4:
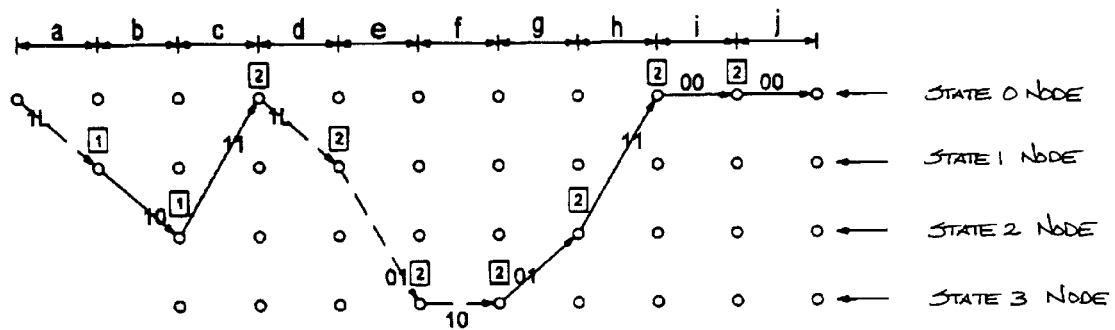
Figures 3, 4:
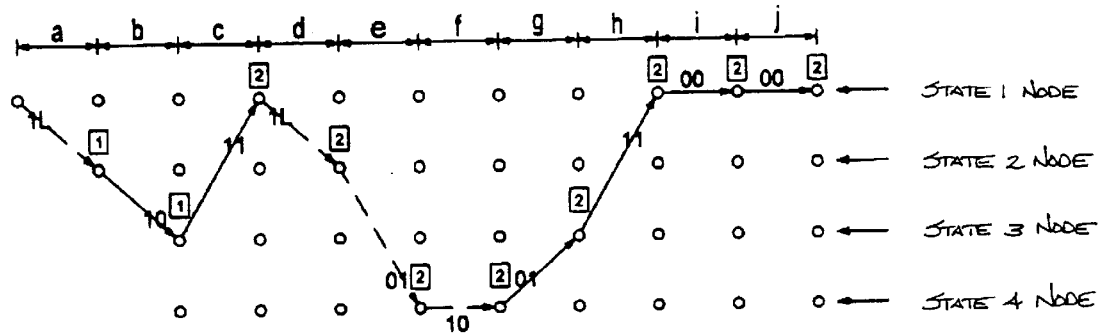
Figure 4:
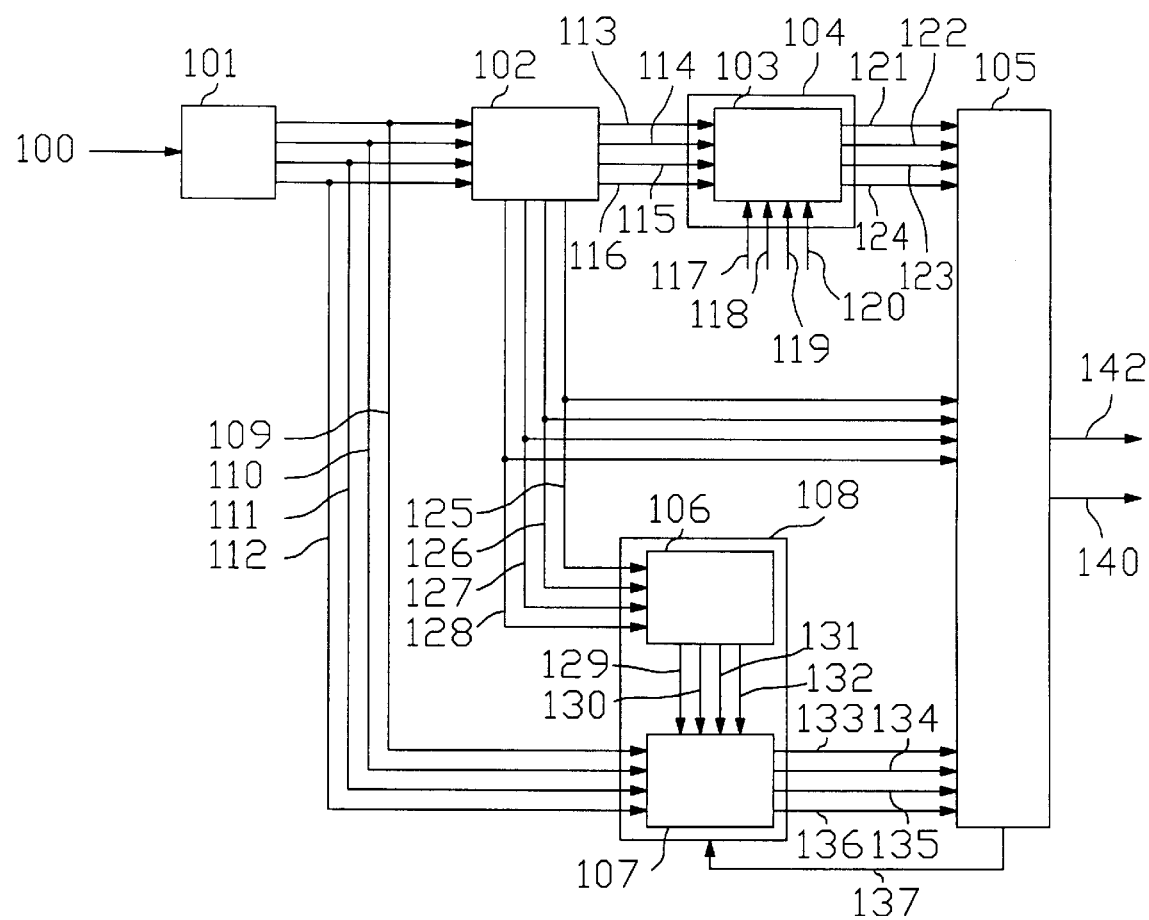
FIG. 4 is an example of a block diagram of a transmission rate determination system of the present invention.

As shown in FIG. 3-4(l), the Viterbi decoding process results in the automatic selection of only one surviving path. The surviving path is characterized by the successive branches which remain for each interval of the diagram from left to right. Thus, the branches of the surviving path, in sequence, are "a dotted line arrow", "a solid line arrow", "a solid line arrow", "a dotted line arrow", "a dotted line arrow", "a dotted line arrow", "a solid line arrow", "a solid line arrow", "a solid line arrow", and "a solid line arrow." As described above, since a solid line arrow corresponds to a decoding result of "0" and a dotted line arrow corresponds to a decoding result of "1", the complete decoding result for the frame becomes "1 0 0 1 1 1 0 0 0 0." Upon examination of the decoding result, it can be recognized, that in spite of the errors which have occurred in the 20 bit frame of received input, the decoding result is free of errors, such that the same ten information bits which were transmitted are again obtained through the decoding process.

As is apparent from the foregoing description, the Viterbi decoding process produces for each frame or portion of a frame of bits, a decoding result and a path metric parameter for the decoding result. In the following, the path metric parameter which corresponds to the final decoding result will be referred to as a final path metric. In the foregoing example, the value of the final path metric is 4.

From the above description of the Viterbi decoding process, it is apparent that the final path metric expresses the reliability of the Viterbi decoding result. It is a matter of course that the smaller the value of the final path metric, the higher the reliability of the Viterbi decoding result.

A transmission rate determination system constructed in accordance with the present invention will now be described, in light of the foregoing background description of convolutional encoding and Viterbi decoding techniques. A receiver receives communications at transmission rates which vary in accordance with a selection made by the transmitter among a set of predetermined transmission rates, such as, for example, 1.2 kbps, 2.4 kbps, 4.8 kbps, and 9.6 kbps. As received, the communications are sequences of convolutionally encoded frames of digital data which are capable of being decoded by a Viterbi decoding process such as described in the foregoing.

FIG. 4 is a block and schematic diagram of a transmission rate determination system constructed in accordance with the present invention. With reference to FIG. 4, a detected symbol signal 100 for a frame of a detected transmission is input to a bit judgment means 101 which is used to combine successive symbols according to bit repetition numbers which correspond to the respective transmission rates. The bit judgment means 101 also includes judging means which determines, at each of the different transmission rates, a value for each of the successive combination of repeated bits. The resultant stream of bit judgments, for each transmission rate, are output by the bit judgment means 101 as the combined bit signals 109, 110, 111 and 112 at the respective transmission rates of 1.2 kbps, 2.4 kbps, 4.8 kbps, and 9.6 kbps.

The bit judgment means 101 can be constructed to perform the bit judgment process according to either one of the methods, in which a hard decision or a soft decision, respectively, of the bit value is provided. In systems in which decoding is performed according to a Viterbi method based on the comparison of Hamming distances, such as described in the foregoing, a method of bit judgment which provides hard decisions of the bit values is adequate. However, in systems in which decoding is performed according to a Viterbi method based on a comparison of Euclidian distances, a method of bit judgment which provides soft decisions of the bit values should be used.

The bit judging operation which provides hard decisions, makes determinations according to the following rule:

for symbols having the value after addition of "0" or higher, the symbol is determined to have the binary bit value of "1"; and for symbols having the value after addition of less than "0", the symbol is determined to have the binary bit value of "0".

The Viterbi decoding means 102 receives the combined bit signals 109 through 112 and decodes them by a Viterbi process, each according to the respective transmission rates. The results are then output by the Viterbi decoding means 102 as the decoded result signals 125, 126, 127, and 128 for the respective transmission rates of 1.2 kbps, 2.4 kbps, 4.8 kbps, and 9.6 kbps. The Viterbi decoding means 102 also outputs the signals 113, 114, 115, and 116 which indicate the final path metrics resulting from the decoding performed at the respective transmission rates.

First transmission rate judgment means 104 includes a threshold value judgment means 103. The threshold judgment means 103 receives the final path metric signals 113, 114, 115, and 116 from the Viterbi decoding means and performs an initial determination of the reliability of the decoding result at each respective transmission rate. The threshold judgment means receives threshold values 117, 118, 119, and 120 which are provided for determining the reliability of the decoding result at the respective transmission rates. As a result of comparing the final path metrics indicated by the signals 113, 114, 115 and 116 with the threshold values 117, 118, 119, and 120 for each of the respective transmission rates, the threshold judgment means 103 provides the threshold judgment signals 121, 122, 123, and 124, which indicate, in each case, whether the threshold value has been exceeded for the tested particular transmission rate.

The threshold value signals 117, 118, 119, and 120 may be set to fixed values in accordance with a hard-wired implementation or semi-fixed values in accordance with an adjustable implementation which may use switches or non-volatile memory, for example, for storing the threshold values. Alternatively, threshold values for the respective transmission rates may be determined dynamically with the aid of sequential logic or a microcode or software implementation based upon the results of current decoding operations. The threshold values so determined may then be passed as input signals 117, 118, 119, and 120 to the threshold value judgment means 103, and may be changed accordingly on a frame by frame basis.

The transmission rate determination means 105 makes a determination of the transmission rate for each received frame of data. The threshold value judgment signals 121, 122, 123 and 124, as described above, provide an initial "go no go" determination of the reliability of the decoding results at each of the prospective transmission rates. A threshold exceeded result will be indicated by a value of "0" on a particular threshold value judgment signal 121, 122, 123, or 124. If only one of the threshold value judgment signals 121, 122, 123, or 124 indicates a below threshold result, (which appears as a "1"), then the transmission rate corresponding to the below threshold result will be indicated by the output 142 and the corresponding decoded result signal from among the signals 125, 126, 127 and 128 will be gated to the decoded result output line 140 by the transmission rate determination means 105. However, if more than one of the threshold value judgment signals 121, 122, 123 and 124 indicates a below threshold result, the transmission rate judging system is provided with further means for providing information with which to determine the transmission rate for the received frame of data.

The transmission rate judging system further includes a second transmission rate judgment means 108 for providing further information to determine a transmission rate when more than one candidate transmission rate is identified by the transmission rate determination means 105 as a result of the operation of the first transmission rate judging means 104. In the simplest instance, the candidate transmission rates are the same as the transmission rates for which the signals 121, 122, 123, or 124 have the threshold judgment values of "1", but the transmission rate determination means 105 may be constructed with further means for selecting candidate transmission rates among the rates for which the threshold judgment values equal "1". The second transmission rate judgment means incorporates a convolutional encoding means 106 and a bit comparison means 107. The convolutional encoding means 106 is used to convert the decoding results output of the Viterbi decoding means 102 back into convolutionally encoded bit sequences. The reencoded output of the encoding means 106 are provided as the signals 129, 130, 131, and 132 which are reencoded at the transmission rates of 1.2 kbps, 2.4 kbps, 4.8 kbps, and 9.6 kbps, respectively.

The bit comparison means 107 receives as inputs the combined bit signals 109, 110, 111 and 112 which correspond to the transmission rates: 1.2 kbps, 2.4 kbps, 4.8 kbps, and 9.6 kbps, respectively. Bit comparison means 107 also receives as inputs the reencoded signals 129, 130, 131, and 132 from the convolutional encoding means 106. The bit comparison means 107 compares the bit rows of the combined bit signals 109, 110, 111, and 112 with the bit rows of the reencoded signals 129, 130, 131, and 132 for each of the respective transmission rates to obtain counts of the number of non-matching bits for each transmission rate. The bit comparison means 107 then outputs these counts as the respective comparison results 133, 134, 135 and 136 for each of the transmission rates which have been selected as candidate transmission rates on signal line 137.

As used, the second transmission rate judgment means 108 performs the above-described operations only for the candidate transmission rates designated on signal line 137 by the transmission rate determination means 105. If the second transmission rate judgment means 108 receives no signal 137 designating a candidate transmission rate, the second transmission rate judgment means 108 does not operate.

However, when the threshold value judgment signals 121, 122, 123 and 124 for the received frame indicate more than one candidate transmission rate selection, the transmission rate determination means 105 signals second transmission rate judgment means 108 through signal 137 to perform bit comparisons between the combined bit signals 109, 110, 111, and 112 and the reencoded signals 129, 130, 131, and 132 for each of the candidate transmission rates selected through signal line 137. In such case, the convolutional encoding means 106 is used to convolutionally reencode the Viterbi decoded signal at the candidate transmission rate from among the decoded signals 125, 126, 127, and 128. The bit comparison means 107 then compares the bit rows of each of the combined bit signals at the candidate transmission rates with the bit rows of each of the reencoded signals at the candidate transmission rates, each combined bit signal being compared with the reencoded signal at the same candidate transmission rate selected through signal line 137 from transmission rate determination means 105. The bit comparison means 107 provides normalized bit comparison outputs 133, 134, 135, and 136 which indicate the number of non-matching bits between the bit rows of the combined bit signals and the reencoded signals for each of the candidate transmission rates after normalization.

The bit comparison means normalizes the number of non-matching bits for each of the candidate transmission rates by multiplying those numbers with a constant determined by the proportional relationship between candidate transmission rates. For example, if the candidate transmission rates are 1.2 kbps and 9.6 kbps, normalization is performed by multiplying the number of non-matching bits at the candidate transmission rate of 1.2 kbps by 8 and multiplying the number of non-matching bits at the candidate transmission rate of 9.6 kbps by 1. The skilled person in the art will recognize the many ways in which normalization can be performed, for example, by multiplying all of the non-matching bit numbers at all transmission rates by constants greater than '1'. Also, it will be recognized that when '1' is selected as a normalization constant for the non-matching bit number which corresponds to a particular transmission rate, e.g. 9.6 kbps, no multiplication need be performed on the non-matching bit number for that particular transmission rate.

The transmission rate determination means 105 receives the normalized bit comparison outputs 133, 134, 135, and 136, and selects the transmission rate corresponding to the smallest normalized non-matching bit number. The transmission rate determination means then outputs the decoded signal at the selected transmission rate from among the decoded signals 125, 126, 127, and 128 on output line 140 as the decoded result for the frame. The transmission rate determination means 105 also provides a selected transmission rate 142 for the frame of received data.

The operations of the transmission rate judgment system according to a first embodiment of the present invention will now be described. The transmission rate judgment system may be used in a communication system in which digital information is encoded in the transmitter by an error correction encoder such as, for example, the convolutional encoder shown in FIG. 2. In the example of operation herein, each frame of data is encoded at a frame interval of 5 msec, such that when the transmission rate is 1.2 kbps, the number of bits per frame is 6 bits; and when the transmission rate is 2.4 kbps, the number of bits per frame is 12 bits. When the transmission rate is 4.8 kbps, the number of bits per frame is 24 bits; and when the transmission rate is 9.6 kbps, the number of bits per frame is 48 bits.

An example of the encoding operations of the transmitter will now be described, for a case in which the transmitter selects a transmission rate of 2.4 kbps for a particular frame, and receives the twelve information bits "1 0 1 0 1 1 1 0 1 0 0 0" to be convolutionally encoded for transmission. The last three bits, which have the values "0 0 0", are added bits which, as described above, are used to reset the convolutional encoder.

After the twelve bit frame of digital information is encoded, the following sequence of bits at 2.4 kbps, i.e. a "bit row," is obtained and transmitted:
1 1 1 0 0 0 1 0 0 0 0 1 1 0 0 1 0 0 1 0 1 1 0 0

As can be seen, if the above sequence of bits which are encoded for transmission at the rate at 2.4 kbps is detected at a rate of 9.6 kbps, the transmitted bit sequence or "bit row" will appear to contain a sequence of bits which are each repeated four times. Thus, the above transmitted bit sequence, as detected at a 9.6 kbps rate, will appear as the sequence of bits shown as follows:

1 1 1 1 1 1 1 1 1 1 1 1 0 0 0 0 0 0 0 0 0 0 0 0
1 1 1 1 0 0 0 0 0 0 0 0 0 0 0 0 0 0 0 0 1 1 1 1
1 1 1 1 0 0 0 0 0 0 0 0 1 1 1 1 0 0 0 0 0 0 0 0
1 1 1 1 0 0 0 0 1 1 1 1 1 1 1 1 0 0 0 0 0 0 0 0

In order to provide greater distinction between the levels of the transmitted information, the transmitter converts a bit having the binary value "1" into the symbol "1" and converts a bit having the binary value "0" into the symbol "−1." Therefore, the actual transmitted symbol row for the frame, when detected at a rate of 9.6 kbps, appears as follows:

1 1 1 1 1 1 1 1 1 1 1 1 −1 −1 −1 −1 −1 −1 −1 −1
−1 −1 −1 −1 1 1 1 1 −1 −1 −1 −1 −1 −1 −1 −1
−1 −1 −1 −1 −1 −1 −1 1 1 1 1 1 1 1 1 1 −1 −1 −1
−1 −1 −1 −1 −1 1 1 1 1 −1 −1 −1 −1 −1 −1 −1

-continued 1 1 1 1 −1 −1 −1 −1 1 1 1 1 1 1 1 1 1 −1 −1 −1
−1 −1 −1 −1 −1

In simplifying the description to follow, it will be assumed that no symbol errors occur during transmission. Thus, a frame of transmitted information symbols, i.e., a "symbol row" appears at the input to the bit judgment means 101 of the transmission rate judging system.

The bit judgment means 101 then combines the received symbols according to the different prospective transmission rates to form the combined bit signals 109, 110, 111, and 112. This operation is performed as a two-step process of adding the received symbols for each of the respective transmission rates, and then determining the values of the received bits, based upon the added signals so obtained. For example, when the prospective transmission rate is 1.2 kbps, the combining is performed by adding each set of eight successively received symbols, and then determining the sequence of received symbols value based upon that added signal. For the prospective transmission rate of 2.4 kbps, each four successively received symbols are added to form an added signal. For the prospective transmission rate of 4.8 kbps, each two successively received symbols are added to form an added signal. Combining according to the above-described adding process improves the bit energy versus noise power ratio for the lower transmission rates. Since, by definition, the transmitted symbol rate is at a maximum for the maximum transmission rate of 9.6 kbps, the bit judgment means 101 need not add the symbols of the received signal to obtain the combined bit signal at the 9.6 kbps rate.

The above-described operations of the bit judgment means 101 produce the following results for a frame having a fixed frame interval of 5 msec and containing a maximum symbol quantity of 96 symbols. The symbol quantity per frame of the detected signal at a prospective transmission rate of 1.2 kbps is 12 symbols, while it is 24 symbols for the 2.4 kbps rate, 48 symbols for the 4.8 kbps rate, and 96 symbols for the 9.6 kbps transmission rate.

Assuming no errors occur during transmission, the symbol row after adding at a prospective transmission rate of 1.2 kbps becomes:

8, 0, −8, 0, −8, 0, 0, 0, −8, 0, 8, −8

When, however, the received signal is added according to a prospective transmission rate of 2.4 kbps, the symbol row becomes:

4, 4, 4, −4, −4, −4, 4, −4, −4, −4, −4, 4, 4,
−4, −4, 4, −4, −4, 4, −4, 4, 4, −4, −4

When the received signal is added according to a prospective transmission rate of 4.8 kbps, the symbol row becomes:

2, 2, 2, 2, 2, 2, −2, −2, −2, −2, −2, −2, 2, 2,
−2, −2, −2, −2, −2, −2, −2, −2, 2, 2, 2, 2,
−2, −2, −2, −2, 2, −2, −2, −2, −2, 2, 2, −2,
−2, 2, 2, 2, 2, −2, −2, −2, −2

Finally, when the received signal is detected according to a prospective transmission rate of 9.6 kbps, the symbol row becomes:

```
  1,  1,  1,  1,  1,  1,  1,  1,  1,  1,  1,  1, -1, -1, -1,
 -1, -1, -1, -1, -1, -1, -1, -1, -1,  1,  1,  1,  1,
 -1, -1, -1, -1, -1, -1, -1, -1, -1, -1, -1, -1,
 -1, -1, -1, -1, -1,  1,  1,  1,  1,  1,  1,  1,  1, -1,
 -1, -1, -1, -1, -1, -1, -1,  1,  1,  1,  1, -1, -1,
 -1, -1, -1, -1, -1, -1,  1,  1,  1,  1, -1, -1,
 -1, -1,  1,  1,  1,  1,  1,  1,  1,  1, -1, -1, -1, -1,
 -1, -1, -1, -1
```

After addition of the received signal into the added signals according to the prospective transmission rates, the bit judgment means 101 determines the sequences of bit values of the respective added signals and outputs the sequences as the combined bit signals 109, 110, 111, and 112.

Thus, the combined bit signal 109 for the received symbol sequence shown above, at the transmission rate of 1.2 kbps is:

1 1 0 1 0 1 1 1 0 1 1 0 (A)

The combined bit signal 110 for the received symbol sequence shown above, at the transmission rate of 2.4 kbps is:

```
1 1 1 0 0 0 1 0 0 0 1 1 0 0 1 0 0 1 0        (B)
1 1 0 0
```

The combined bit signal 111 for the received symbol sequence shown above, at the transmission rate of 4.8 kbps is:

```
1 1 1 1 1 1 0 0 0 0 0 0 1 1 0 0 0 0 0         (C)
0 0 0 1 1 1
1 0 0 0 0 1 1 0 0 0 0 1 1 0 0 1 1 1 1 0 0
```

The combined bit signal 112 for the received symbol sequence shown above, at the transmission rate of 9.6 kbps is:

```
1 1 1 1 1 1 1 1 1 1 1 1 0 0 0 0 0 0 0         (D)
0 0 0 0 0 1
1 1 1 0 0 0 0 0 0 0 0 0 0 0 0 0 0 0 0 1 1 1 1 1
1
1 1 0 0 0 0 0 0 0 0 1 1 1 1 0 0 0 0 0 0 0 0 1 1
1
1 0 0 0 0 1 1 1 1 1 1 1 1 0 0 0 0 0 0 0 0 0
```

As can be seen from the combined bit signals illustrated above, the combined bit signals which are obtained for transmission rates other than the transmission rate at which the frame is actually transmitted, results in significant incorrect bit determinations.

Viterbi decoding means 102 receives the combined bit signals 109, 110, 111 and 112 and decodes them according to a Viterbi decoding method, such as described in the foregoing, to obtain decoding results 125, 126, 127, and 128, and final path metrics 113, 114, 115, and 116 for each of the transmission rates 1.2 kbps, 2.4 kbps, 4.8 kbps and 9.6 kbps, respectively. Here, the Viterbi decoding operation need not be described in detail, that having already been provided in the foregoing description. As a result of decoding the combined bit signals as set forth in the text above s (A), (B), (C), and (D), the Viterbi decoding means provides final path metrics 113, 114, 115, and 116 to he threshold judgment means 103, which have the values 2, 0, 7 and 12 for the respective transmission rates of 1.2 kbps, 2.4 kbps, 4.8 kbps, and 9.6 kbps.

The threshold judgment means 103 normalizes the received values of the final path metrics and judges whether any of those values exceed the corresponding threshold values 117, 118, 119, and 120. Normalization is performed by multiplying the final path metric value obtained for each transmission rate with a constant determined by the proportional relationship between the particular transmission rate and the maximum transmission rate. For example, if the maximum transmission rate is set to 9.6 kbps, as is the case for this example, normalization is performed for the final path metric obtained at the transmission rate of 1.2 kbps by multiplying the final path metric value by 8. The final path metric obtained for the 9.6 kbps transmission rate is multiplied by 1 only, since 9.6 kbps is the highest transmission rate. Hence, suitable normalization constants for use in this example are: 8, 4, 2, and 1 for the transmission rates of 1.2 kbps, 2.4 kbps, 4.8 kbps, and 9.6 kbps, respectively. The normalized final path metric values, for this example, therefore become 16, 0, 14, and 12 for the signal decoded according to the transmission rates of 1.2 kbps, 2.4 kbps, 4.8 kbps, and 9.6 kbps, respectively.

Continuing, the threshold values 117, 118, 119, and 120, in this example, are each set to the value "5". Here, it is clear that the final path metric values obtained when decoding at prospective transmission rates other than the actual 2.4 kbps rate used to transmit exceed the threshold values set to "5" in every case. The threshold value judgment means 103 compares the value of each of the final path metric signals 113, 114, 115, or 116 to the corresponding threshold value 117, 118, 119, or 120 for that transmission rate. If the normalized value of the final path metric for a particular transmission rate does not exceed the corresponding threshold value, the threshold value judgment means 103 outputs a threshold judgment value of "1" which indicates that the decoding result for the particular transmission rate has high reliability. The threshold judgment value is output on the particular line among the lines 121, 122, 123, and 124 which corresponds to the transmission rate of the decoded signal.

However, if the normalized value of the final path metric for a particular transmission rate exceeds the corresponding threshold value, the threshold value judgment means 103 outputs a threshold judgment value of "0", which indicates that the decoding result for the particular transmission rate does not have high reliability. In the example herein, the threshold value judgment means 103 outputs the threshold judgment values on lines 121, 122, 123, and 124 of "0", "1", "0", and "0" for the respective transmission rates of 1.2 kbps, 2.4 kbps, 4.8 kbps, and 9.6 kbps. The skilled person in the art will recognize that the first transmission rate judgment means 104 may incorporate additional logic for performing more complex calculations to arrive at a threshold value judgment. Such additional logic may be implemented either in hard-wired form or using a fixed or nonvolatile, albeit, alterable control store, such as can be implemented with a ROM, PROM or an EEPROM memory device.

When a threshold judgment value of "1" appears on only one of the output lines 121, 122, 123 and 124, the transmission rate determination means 105 selects the transmission rate which corresponds to the particular threshold judgment value as the correct one. The transmission rate determination means 105 outputs the rate determination on line 142 and gates the decoded result output of Viterbi decoder 102 at that transmission rate to output line 140. In this example, since the threshold judgment value is "1" only for the final path metric of the signal decoded at the transmission rate of 2.4 kbps, the transmission rate determination becomes 2.4 kbps. Indication of the transmission rate determination is provided on output line 142. In this example, where the final path metric for the decoding results in a threshold judgment value of "1" for only one transmission rate, the second transmission rate judgment means 108 does not play a role in the transmission rate determination.

However, in cases where the threshold judgment means 103 outputs threshold judgment values of "1" based on final path metrics obtained for decoding at more than one transmission rate, the second transmission rate judgment means 108 is then signalled to perform further operations to assist the transmission rate determination means in determining the transmission rate of the received frame of data. The transmission rate determination means 105 signals the second transmission rate judgment means through line 137, indicating the candidate transmission rates for which further operations are to be performed for selecting the correct transmission rate for receiving the frame.

The operations of the second transmission rate judgment means 108 will now be described for the example in which the threshold judgment values appearing on signal lines 121 and 122 for the transmission rates 1.2 kbps and 2.4 kbps, respectively, equal "1", but for no other transmission rates on signal lines 123 and 124. On the basis of the threshold value judgment signals 121, 122, 123 and 124, the transmission rate determination means 105 provides a signal 137 to indicate to the second transmission rate judgment means 108 that candidate transmission rates 1.2 kbps and 2.4 kbps have been identified.

Next, the convolutionally encoding means 106 reencodes the decoded result signals 125 and 126 which were obtained for the transmission rates of 1.2 kbps and 2.4 kbps, respectively, and outputs the reencoded signals on lines 129 and 130 to bit comparison means 107. The details of the decoding operations performed by the Viterbi decoding means 102 are thoroughly described in the foregoing; they need not be described in any further detail. Thus, the decoding result 125 for the received frame at the 1.2 kbps transmission rate becomes "1 1 0 0 0 0", while the decoding result 126 for the received frame at the 2.4 kbps transmission rate becomes "1 0 1 0 1 1 1 0 1 0 0 0".

The result of reencoding the decoding result signals 125 and 126 by the convolutional encoding means 106 produces the reencoded bit sequences (1') and (2') for the respective transmission rates 1.2 kbps, and 2.4 kbps, as follows:

| | |
|---|---|
| "1 0 0 1 0 1 1 1 0 0 0 0" | (A') |
| "1 1 1 0 0 0 1 0 0 0 0 1 1 0 0 1 0 0 1 0 1 1 0 0" | (B') |

For each of the candidate transmission rates 1.2 kbps and 2.4 kbps, in this example, the bit comparison means 107 compares the combined bit signals from the bit judgment means 101 with the reencoded signals which are output from the convolutional encoding means 106. In this example, the combined bit signal 109 for the 1.2 kbps transmission rate takes the value as indicated in the bit row identified in the foregoing as (A). The combined bit signal 109 is compared to the reencoded output signal 129 which takes the value indicated in the bit row identified above as (A'). In the same manner, the combined bit signal 110 for the transmission rate of 2.4 kbps, which is identified in the foregoing as (B), is compared to the reencoded output signal 130 which is identified above as (B').

As a result of these comparisons, for each of the candidate transmission rates, the bit comparison means 107 produces a count of the number of non-matching bits between the bit-rows of the respective combined bit and reencoded signals. Thus, for the 1.2 kbps transmission rate, where the combined bit signal (A) and the reencoded output signal (A') are:

| | |
|---|---|
| "1 1 0 1 0 1 1 1 0 1 1 0" | (A) |
| "1 0 0 1 0 1 1 1 0 0 0 0" | (A') | the number of non-matching bits is 3. This number is held as a count to be normalized prior to being output to transmission rate determination means 105.

For the 2.4 kbps transmission rate, where the combined bit signal (B) and the reencoded output signal (B') are:

| | |
|---|---|
| "1 1 1 0 0 0 1 0 0 0 0 1 1 0 0 1 0 0 1 0 1 1 0 0" | (B) |
| "1 1 1 0 0 0 1 0 0 0 0 1 1 0 0 1 0 0 1 0 1 1 0 0" | (B') | the number of non-matching bits is 0. This number is held as a count to be normalized prior to being output to transmission rate determination means 105.

Next, the count of the non-matching bits is normalized for each candidate transmission rate. Normalization is performed by multiplying the non-matching bit count for the 1.2 kbps transmission rate by 8, multiplying the non-matching bit count for the 2.4 kbps transmission rate by 4, and multiplying the non-matching bit count for the 4.8 kbps transmission rate, if any, by 2. The normalized non-matching bit counts are output on line 133, 134, 135, and 136 to transmission rate determination means 105. In this example, the normalized non-matching bit count 133 for the 1.2 kbps transmission rate takes the value "24" and the normalized non-matching bit count 134 for the 1.2 kbps transmission rate takes the value "0".

The transmission rate determination means 105 selects the transmission rate for which the lowest non-matching bit count is obtained. Selection of the transmission rate in this manner is consistent with decoding theory, since the theory indicates that higher non-matching bit counts are likely to be due to decoding the transmission at the wrong transmission rate. In this example, the 2.4 kbps transmission rate is determined to be the transmission rate judgment result for the received frame of data.

In the foregoing description of the first preferred embodiment of the invention, the selection and operation of convolutional encoding and Viterbi decoding are intended to be exemplary, rather than limiting in any way. The present invention is not limited to any one type of data encoding, such as a convolutional error correction code, nor is it limited to Viterbi decoding of the same. By the same token, the only requirements for the applicability of a particular encoding method to the present invention are that it be subject to a decoding method which provides a decoding result and provides a parameter which expresses the reliability of the decoding result.

The structure and operations of a Code Division Multiple Access (CDMA) receiver constructed according to a second embodiment of the present invention will now be described, with reference to FIG. 5. The CDMA receiver is used in a communication system which permits the transmitter to select a transmission rate from a group of predetermined transmission rates for transmitting one or more frames of data. Such communication system permits the transmission rate selection to be made based on the quantity of digital information to be transmitted in a given interval which corresponds to the duration of a frame, wherein the frame duration remains constant irrespective of the transmission rate. In such a CDMA communication system the digital information to be transmitted is encoded with an error correction code, and is modulated for transmission by multiplication with a pseudo-random spread code. The result of such multiplication produces a spread spectrum modulated signal for transmission over a transmission channel of a medium which is typically wireless, but which may involve wired or optically guided media. For use in such CDMA communication system, a CDMA receiver must be capable of determining the transmission rate for each received frame of data from the characteristics gleaned from the data detected in the received frame.

Figure 5:
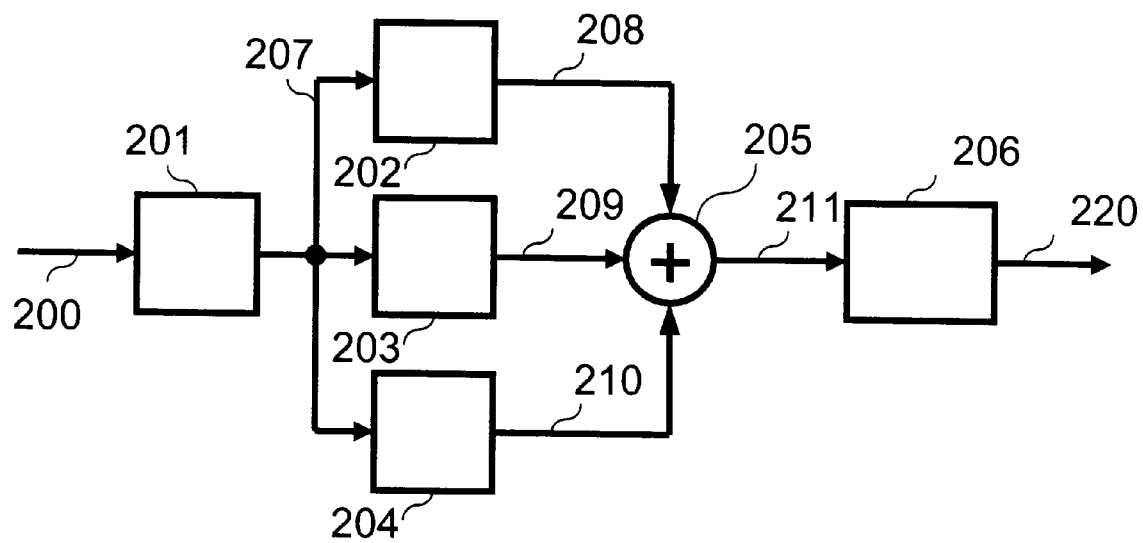
FIG. 5 is an example of the structure of a CDMA receiver of the present invention.

An example of the structure of a CDMA receiver constructed according with the present invention is illustrated in FIG. 5. In FIG. 5, analog to digital (A/D) conversion means 201 is used to convert a detected analog signal 200 into digital form, and to output a digital signal 207. Reference numerals 202, 203, and 204 are demodulation means, also known as despreading means or "finger circuits", which are used to extract received symbol signals 208, 209 and 210 from two or more different multipath components of a transmission signal. The demodulation means 202, 203, and 204 extract the received symbols by multiplying the detected digital signal 207 with the same spread code set to the same phase as that used to spread code modulate the signal for transmission. Each demodulation means 202, 203, and 204 performs the symbol extraction at particular reception timings which correspond to the relative difference in arrival times of the multipath components. In-phase addition means 205 is used to add the received symbols 208, 209 and 210, accounting for the different arrival times, and to output the results as a combined detected symbol signal 211.

The transmission rate judgment means 206 is constructed as described in the foregoing description of the first embodiment of the invention and operates in the same manner. The transmission rate judgment means 206 receives as input the combined detected symbol signal 211 and generates judged result output signal 220. Using the combined detected symbol signal 211 the transmission rate judgment means 206 determines the transmission rate for the received frame of data according to the operations of the first transmission rate judgment means 105 or the second transmission rate judgment means 108, which are incorporated within the transmission rate judgment means 206 and operate as described in the foregoing. In this case, fixed threshold values 117, 118, 119 and 120 are adequate for use as inputs to the threshold value judgment means 103 of the transmission rate judgment means 206.

The operations of a CDMA receiver constructed in accordance with this second embodiment of the present invention will now be described. In the following description, the detected signal at the input to the A/D conversion means 201 of the CDMA receiver will be assumed to be at baseband frequency.

FIG. 6(a) illustrates an example of how a digital information signal 601 is modulated by a pseudo-random code 603 to produce a spread spectrum modulated information signal 605 for transmission. Typically, the spread spectrum modulated information signal will be shifted to a transmission frequency for transmission over a wireless or other radio frequency transmission medium but spread spectrum techniques can be envisioned for use in other transmission media. Such frequency shifting techniques are well-known and need not be described in any further detail.

In a wireless mobile communication environment, transmitted signals are subject to splitting into multipath component signals through reflection of the transmitted signal by objects such as buildings, or other man-made or natural objects, etc. Thus, a transmitted signal is received at a mobile communication receiver as a plurality of multipath component signals which arrive at different reception timings according to the relative lengths of the paths along which the multipath components have been received.

Figure 6:
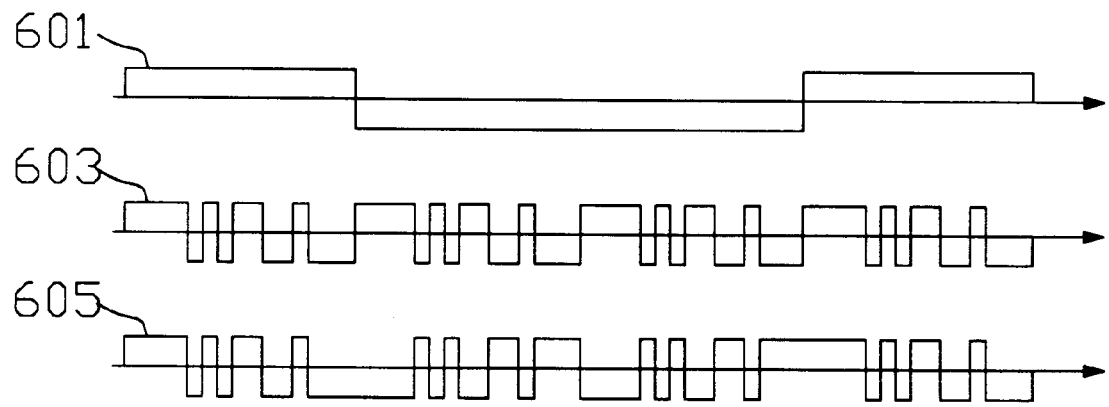
FIG. 6(a) illustrates how a digital information signal is modulated by a pseudo-random code to produce a spread spectrum modulated information signal in a CDMA transmitter.
FIG. 6(b) illustrates multipath components of a detected signal in a CDMA receiver.
Figure 6:
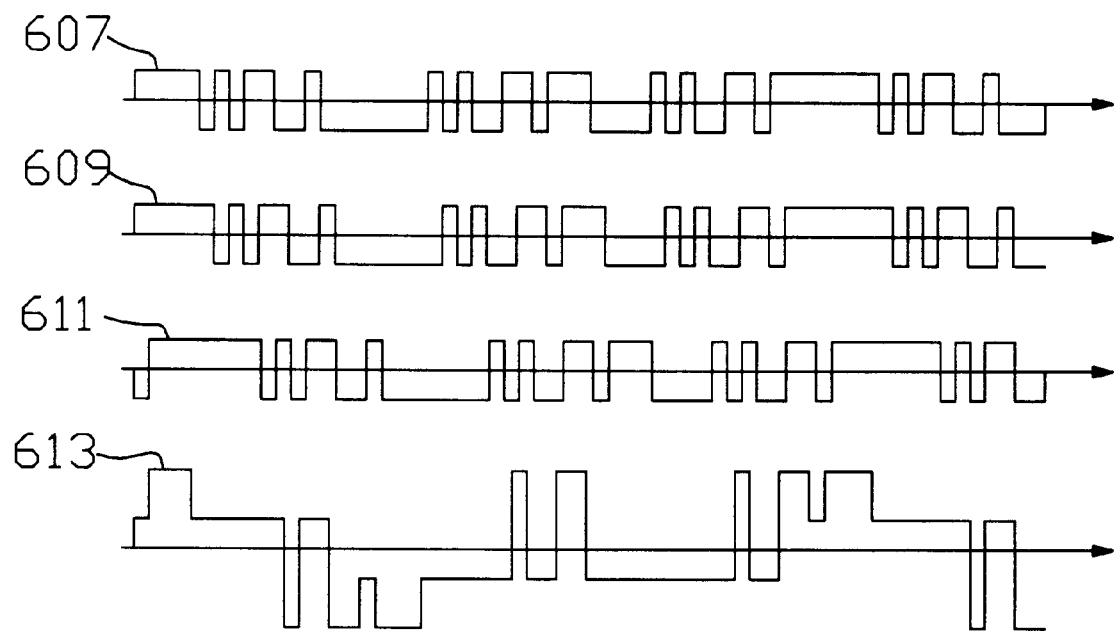

FIG. 6(b) illustrates an example of multipath components of a detected signal at the input to analog to digital (A/D) conversion means 201 of the CDMA receiver. A detected signal which arrives at a reception timing corresponding to a first multipath component of a transmitted signal is shown as signal 607 of FIG. 6(b). Another detected signal which arrives at a slightly delayed reception timing corresponding to a second multipath component is shown as signal 609. Finally, a third detected signal which arrives at another delayed reception timing corresponding to a third multipath component is shown as signal 611. The result of the combination of the detected signals 607, 609, 611, without accounting for the variations in reception timings, appears as an input detected digital signal 613 shown in FIG. 6.

Thus, the detected digital signal 207 contains multipath components which can be separately demodulated according to their respective reception timings by the demodulation means 202, 203, and 204. The results of the demodulation processes so performed yield the detected symbol signals 208, 209 and 210. The detected symbol signals 208, 209, and 210 are then added in phase by in-phase addition means 205 to form a single combined signal 211 which is input to transmission rate judging system 206. The transmission rate judging system 206 thereupon determines the transmission rate of the received frame of data in accordance with the process described in the first embodiment of the present invention. The results are then output by the transmission rate judging system 206 as a transmission rate determination and a decoded result at that transmission rate.

Figure 7:
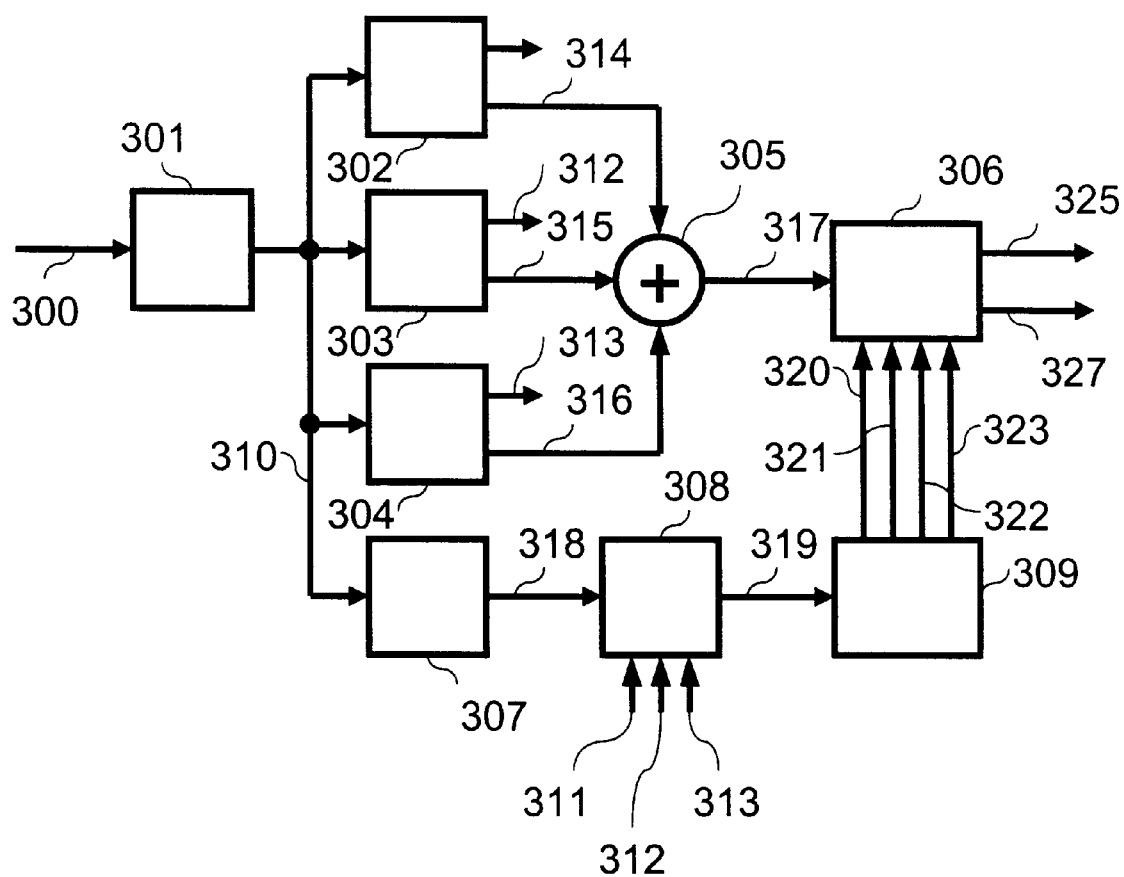
FIG. 7 shows another example of the structure of a CDMA receiver of the present invention.

An example of a CDMA receiver constructed according to a third embodiment of the present invention will now be described with reference to FIG. 7. As shown in FIG. 7, the CDMA receiver includes an analog to digital (A/D) conversion means 301 which is used to convert a detected analog signal 300 into a detected digital signal 310. A plurality of spread spectrum demodulation means 302, 303, and 304 are used to demodulate multipath components contained in the detected digital signal 310, in accordance with assigned spread code phases and reception timings corresponding to each of the multipath components. While the number of demodulation means shown in FIG. 7 is three, the skilled person in the art will recognize the improvement in receiver performance which occurs with incremental additions to the number of demodulation means. However, no more than two demodulation means are necessary to realize the benefits which flow from the embodiment of the present invention described herein. The demodulation means are also referred to as despreading means, and "finger circuits," in the context of receivers used to demodulate spread spectrum transmissions.

Demodulation means 302, 303, and 304 produce the demodulated output signals 314, 315, and 316, which respectively contain streams of detected symbols corresponding to each of the multipath components of the incoming transmission. The demodulation means 302, 303, and 304 also provide outputs 311, 312, and 313 which indicate signal correlation levels representative of the detected power in each of the demodulated signals 314, 315, and 316. Combining means 305 is used to add the demodulated signals 314, 315, and 316, after adjusting for their respective reception timings, so as to produce a combined demodulated signal 317.

The CDMA receiver further includes a transmission rate judgment means 306, such as is described in the foregoing description of the first embodiment of the invention. The transmission rate judgment means 306 receives as inputs the combined demodulated signal 317 and the threshold values 320, 321, 322, and 323, for the respective transmission rates of 1.2 kbps, 2.4 kbps, 4.8 kbps, and 9.6 kbps, respectively, and produces a decoded result output 325 and a transmission rate determination signal 327, such as described in the foregoing description of the transmission rate judgment means.

The CDMA receiver is further provided with a total received power measurement means 307 for producing a total detected power signal 318 indicative of the magnitude of the total power in the detected digital signal 310. A transmission state prediction means 308 is used to provide a transmission state prediction signal 319 based on the inputs: the total detected power signal 318, and the detected power signals 311, 312, and 313. The transmission state prediction means 308 determines a transmission state prediction by calculating the ratio of the signal power indicated by each of the detected power signals 311, 312, and 313 to the power indicated by the total detected power signal 318. The signal power ratios are then combined, such as by taking the average, to provide a transmission state prediction signal 319 which is used to provide indication of the conditions in the transmission channel which prevail at a given point in time.

The threshold value determination means 309 is used to provide a set of independently assignable threshold values 320, 321, 322, and 323 which correspond to the various possible transmission rates, viz. 1.2 kbps, 2.4 kbps, 4.8 kbps, and 9.6 kbps, at which a frame of data may be received. The threshold values are determined by the threshold value determination means 309 in accordance with the transmission state prediction signal 319 which is received from the transmission state prediction means 308. For determining the multiple threshold values 320, 321, 322, and 323, a table look-up method which provides sets of threshold values corresponding to different values of the transmission state prediction signal 319, has been identified as one of many appropriate ways.

The operations of the CDMA receiver constructed in accordance with the third embodiment of the present invention will now be described. A detected baseband transmission signal is input to A/D conversion means 301 from a detection device, such as an antenna and front-end frequency tuner combination. After the conversion, the digital detected signal 310 is input to the demodulation means 302, 303, and 304, which demodulate individual multipath components of the detected digital signal 310 and provide the demodulated output signals 314, 315, and 316 to combining means 305. Detected power signals 311, 312, and 313 are generated from the detected digital signal 310 through a known process of correlating the respective multipath components of the detected digital signal 310 with assigned phases of a pseudo-random spread code at their respective reception timings. The combining means 305 then combines the demodulation signals 314, 315, and 316, after adjusting for the respective reception timings, so as to produce a combined demodulated signal 317 which is input to the transmission rate judging system 306.

The total received power measurement means 307 also receives the digital detected signal 310 and outputs a total received power signal 318 which represents the signal power contained in the transmission. The total received power signal is input to the transmission state prediction means 308, along with the detected power signals 311, 312, and 313 for the respective multipath components of the transmission, and a transmission state prediction signal 319 is produced thereby as output. The threshold value determination means 309 then uses the transmission state prediction signal 319 to determine, a set of threshold values 320, 321, 322, and 323 to be provided to the transmission rate judging system 306 for use in determining the transmission rate at which a frame of detected symbols has been received. The transmission rate judging system 306 then operates in the manner as described in the foregoing description of the transmission rate judging system of the first embodiment of the invention, to output a transmission rate determination 327 and a decoded result output 325 at that transmission rate.

As is apparent from the foregoing description, the operation of the CDMA receiver according to this embodiment of the invention provides for dynamic adjustment in response to the transmission state of a channel (e.g. the relative strength of multipath components). Such adjustment is performed by selecting threshold values 320, 321, 322, and 323 in accordance with a transmission state prediction signal 319 representative of the relative strength of multipath signal components of a transmission.

While the invention has been described in detail herein in accordance with certain preferred embodiments thereof, many modifications and changes therein may be effected by those skilled in the art. Accordingly, it is intended by the appended claims to cover all such modifications and changes as fall within the true scope and spirit of the invention.

What is claimed is:

1. A method for determining an actual transmission rate of an encoded communication transmitted at one of a plurality of transmission rates, comprising the steps of:
    (a) decoding said encoded communication at said plurality of transmission rates to generate a plurality of decoded signals;
    (b) determining a decoding reliability parameter corresponding to each of said decoded signals;
    (c) identifying one or more candidate transmission rates at which said encoded communication has been reliably decoded based upon said decoding reliability parameters, wherein said identifying is performed by comparing said decoding reliability parameters with threshold values; and
    (d) determining said actual transmission rate from said one or more candidate transmission rates.

2. The method in accordance with claim 1 wherein said actual transmission rate is determined to be said candidate transmission rate if the number of candidate transmission rates is one.

3. The method in accordance with claim 1 wherein, if the number of candidate transmission rates exceeds one, said actual transmission rate is determined by performing the steps of:
    (a) reencoding, for each candidate transmission rate, said decoded signal which was decoded at said candidate transmission rate in said step of decoding to produce a reencoded communication;
    (b) comparing, at each candidate transmission rate, said reencoded communication encoded at said candidate transmission rate and said encoded communication; and
    (c) determining the actual transmission rate of said encoded communication to be said transmission rate which results in the closest comparison.

4. The method in accordance with claim 3 wherein said step of comparing includes determining the number of non-matching bits between said encoded communication and said reencoded communication encoded at said candidate transmission rate.

5. The method in accordance with claim 1 wherein said threshold values are determined based on measured reception conditions.

6. The method in accordance with claim 5 wherein said measured reception conditions are determined by measurements of received power in a plurality of multipath components of said communication.

7. The method in accordance with claim 6 wherein said measured reception conditions are determined by a measurement of total received power in said encoded communication.

8. The method in accordance with claim 7 wherein said measured reception conditions are determined by calculating one or more ratios of said received power in at least one of said plurality of multipath components to said total received power.

9. A system for determining an actual transmission rate of an encoded communication transmitted at one of a plurality of transmission rates, comprising:

means for decoding said encoded communication at said plurality of transmission rates to generate a plurality of decoded signals and a decoding reliability parameter for each of said decoded signals;

means for identifying one or more candidate transmission rates at which said encoded communication has been reliably decoded based upon said decoding reliability parameters, wherein said means for identifying includes means for comparing said decoding reliability parameters with threshold values; and means for determining said actual transmission rate from said one or more candidate transmission rates.

10. The system in accordance with claim 9 wherein said means for determining includes:

means for reencoding each of said decoded signals at the same candidate transmission rate at which said decoded signals were decoded by said decoding means to produce reencoded signals;

means for comparing said reencoded signals to said encoded communication; and means for determining said actual transmission rate of said encoded communication based on the results of said comparison.

11. The system in accordance with claim 10 wherein said means for comparing determines the number of non-matching bits between said encoded communication and said reencoded signals.

12. The system in accordance with claim 9 further including means for determining said threshold values based on measured reception conditions.

13. The system in accordance with claim 12 wherein said measured reception conditions are based on measurements of received power in a plurality of multipath components of said encoded communication.

14. The system in accordance with claim 13 wherein said measured reception conditions are based upon measurement of the total received power in said encoded communication.

15. The system in accordance with claim 14 wherein said measured reception conditions are determined by calculating one or more ratios of said received power in at least one of said plurality of multipath components to said total received power.

16. A spread spectrum communications receiver for demodulating and decoding a communication transmitted at any of a plurality of predetermined transmission rates, comprising:

a plurality of demodulation means for demodulating each of a plurality of multipath components of a communication signal;

means for combining said demodulated multipath components to produce a combined demodulated signal;

means for measuring reception conditions;

means responsive to said combined demodulated signal and said measured reception conditions for determining an actual transmission rate at which said communication was transmitted and for producing a decoded communication signal at said actual transmission rate.

17. The communications receiver in accordance with claim 16 wherein said means for determining an actual transmission rate further includes:

means for decoding said communication at said plurality of transmission rates to generate a plurality of decoded signals and a decoding reliability parameter for each of said decoded signals;

means for identifying one or more candidate transmission rates at which said communication has been reliably decoded based upon said decoding reliability parameters; and means for determining said actual transmission rate from said one or more candidate transmission rates.

18. The communication receiver in accordance with claim 17 wherein said means for determining said actual transmission rate from said one or more candidate transmission rates includes:

means for reencoding each of said decoded signals at the same candidate transmission rate at which each said decoded signal was decoded by said decoding means to produce reencoded signals;

means for comparing said reencoded signals to said communication; and means for determining said actual transmission rate of said communication based on the results of said comparison.

19. The communication receiver in accordance with claim 17 wherein said means for identifying includes means for comparing said decoding reliability parameters with threshold values selected on the basis of said measured reception conditions.

20. The communication receiver in accordance with claim 16 wherein said means for measuring reception conditions includes means for measuring received power in each of said multipath components of said communication.

21. The communication receiver in accordance with claim 20 wherein said means for measuring reception conditions further includes means for measuring the total received power in said communication.

22. The communication receiver in accordance with claim 21 wherein said reception conditions are determined by calculating one or more ratios of said received power in at least one of said plurality of multipath components to said total received power.

* * * * *